United States Patent Office 3,637,901
Patented Jan. 25, 1972

3,637,901
EPOXY RESIN COMPOSITION CONTAINING A PREPOLYMER OF AN N,N'-BIS-IMIDE AND A DIAMINE
Michel Bargain, Lyon, and Max Gruffaz, La Mulatiere, France, assignors to Rhone-Poulenc S.A., Paris, France
No Drawing. Filed May 28, 1970, Ser. No. 41,583
Claims priority, application France, May 30, 1969, 6917862
Int. Cl. C08g 45/06, 45/12
U.S. Cl. 260—830 P                                9 Claims

ABSTRACT OF THE DISCLOSURE

Cured epoxy resins of good heat resistance are made by heating an epoxy resin with a prepolymer melting below 200° C. made from an N,N'-bis-imide, e.g. N,N'-4,4'-diphenylmethane-bis-maleimide, and a diamine.

---

The present invention relates to the curing of epoxy resins.

Epoxy resins, i.e. substances or mixtures of substances containing on average more than one epoxy group per molecule, have been known for many years. They can be more or less viscous liquids or solids of low melting point. Typical examples of such resins are the products of the condensation of epichlorhydrin in an alkaline medium with organic compounds possessing alcoholic or phenolic hydroxyl groupings.

Epoxy resins can be irreversibly cured under the influence of heat in the presence of acid or amine reagents. They then yield three-dimensional materials which have remarkable properties of adhesion, of hardness and of resistance to chemical reagents. These materials have, in the form of composite articles, found many outlets in the aeronautical industry.

It has been proposed to incorporate into epoxy resins, before they are cured, polymers or polycondensates which contribute to an improvement in one or more of the properties of the cured resins, and some of these polymers or polycondensates simultaneously act as a curing agent. For example, to increase flexibility, it has been proposed to add polysulphides or resins containing amide groupings to epoxy resins, while to obtain homogeneous and non-corrosive varnishes intended essentially for the paint industry it has been suggested to use nitrogen-containing resins of the urea-formaldehyde or melamine-formaldehyde type. The use of such additives contributes to solving a particular problem, but the cured resins obtained do not generally meet the demands posed by subjection of them to severe and prolonged heat exposure.

Further, such polymers or polycondensates are frequently incompatible with epoxy resins, and such incompatibility can be undesirable where the mixture is to be used to produce a resin which after curing must have a homogeneous and compact structure. At the present time, it is not possible to say a priori how the structure of a high molecular weight material affects its compatibility with an epoxy resin.

The present invention provides a process for producing a cured epoxy resin which comprises heating an epoxy resin with a prepolymer having a melting point below 200° C. obtained by heating an N,N'-bis-imide of the formula:

$$D\begin{matrix}CO\\ \diagdown\\ CO\end{matrix}N-A-N\begin{matrix}CO\\ \diagup\\ CO\end{matrix}D \qquad \text{I}$$

in which D represents a divalent organic radical containing a carbon-carbon double bond and A is a divalent organic radical containing at least two carbon atoms, with a diamine of the formula:

$$H_2N-B-NH_2 \qquad \text{II}$$

in which B represents a divalent organic radical of not more than 30 carbon atoms, the ratio $$\frac{\text{No. of mols of N,N'-bis-imide}}{\text{No. of mols of diamine}}$$

being at least 1.

This process yields cured resins which have excellent mechanical properties and which are remarkably resistant to heat, for example, prolonged exposure to temperatures of the order of 250° C.

The symbol D is derived from an anhydride of an ethylenically unsaturated dicarboxylic acid of the formula:

$$D\begin{matrix}CO\\ \diagdown\\ CO\end{matrix}O \qquad \text{III}$$

which can be, for example, maleic anhydride, citraconic anhydride, itaconic anhydride, pyrocinchonic anhydride, dichloromaleic anhydride or a Diels-Alder reaction product of one of these anhydrides with an acyclic, alicyclic or heterocyclic diene, e.g. cyclopentadiene. Examples of anhydrides resulting from such a diene synthesis may be found in volume IV of "Organic Reactions" (John Wiley & Sons, Inc.).

The symbols A and B can be identical or different and may each represent a linear or branched alkylene radical having fewer than 13 carbon atoms, a phenylene or cyclohexylene radical, or a radical The symbols A and B can also contain several phenylene or cyclohexylene radicals linked to one another by a simple valency bond or by an inert atom or group such as —O—, —S—, an alkylene group of 1 to 3 carbon atoms, —CO—, —SO$_2$—, —NR$_1$—, —N=N—,

—CONH—, —COO—, —P(O)R$_1$—

—CONH—X—NHCO— wherein R$_1$ represents a hydrogen atom, an alkyl radical of 1 to 4 carbon atoms, or a phenyl or cyclohexyl radical, and X represents an alkylene radical having fewer than 13 carbon atoms, a phenylene or a cyclohexylene radical. The various phenylene or cyclohexylene radicals can be substituted by methyl groups.

By way of specific examples of bis-imides of Formula I, there may be mentioned:

N,N'-ethylene-bis-maleimide,
N,N'-hexamethylene-bis-maleimide,
N,N'-metaphenylene-bis-maleimide,
N,N'-para-phenylene-bis-maleimide,
N,N'-4,4'-diphenylmethane-bis-maleimide,
N,N'-4,4'-diphenyl-ether-bis-maleimide,
N,N'-4,4'-diphenylsulphone-bis-maleimide,
N,N'-4,4'-dicyclohexylmethane-bis-maleimide,
N,N'-$\alpha,\alpha'$-4,4'-dimethylene-cyclohexane-bis-maleimide,
N,N'-meta-xylylene-bis-maleimide,
N,N'-4,4'-diphenylcyclohexane-bis-maleimide,
N,N'-meta-phenylene-bis-tetrahydrophthalimide and
N,N'-4,4'-diphenylmethane-bis-citraconimide.

These bis-imides can be prepared by application of the method described in United States Pat. No. 2,444,536 for the preparation of N-aryl-maleimides.

As examples of diamines of Formula II which can be used for the preparation of the prepolymer, there may be mentioned 4,4'-diamino-dicyclohexylmethane,
1,4-diamino-cyclohexane,
2,6-diamino-pyridine,
meta-phenylenediamine,
para-phenylenediamine,
4,4'-diaminodiphenyl-methane,
2,2-bis(4-aminophenyl)propane,
benzidine, 4,4'-diaminophenyl-oxide,
4,4'-diaminodiphenyl-sulphide,
4,4'-diaminodiphenyl-sulphone,
bis(4-aminophenyl)methylphosphine oxide,
bis(4-aminophenyl)phenylphosphine oxide,
bis(4-aminophenyl)methylamine,
1,5-diaminonaphthalene,
meta-xylylenediamine,
para-xylylenediamine,
1,1-bis(para-aminophenyl)phthalane,
hexamethylenediamine,
6,6'-diamino-2,2'-dipyridyl,
4,4'-diamino-benzophenone,
4,4'-diamino-azobenzene,
bis(4-aminophenyl)phenylmethane,
1,1-bis(4-aminophenyl)cyclohexane,
1,1-bis(4-amino-3-methyl-phenyl)cyclohexane,
2,5-bis-(m-aminophenyl)-1,3,4-oxadiazole,
2,5-bis(p-aminophenyl)-1,3,4-oxadiazole,
2,5-bis(m-aminophenyl)thiazolo(4,5-d)thiazole,
5,5'-di(m-aminophenyl)-(2,2')-bis(1,3,4-oxadiazolyl),
4,4'-bis-(p-aminophenyl)-2,2'-dithiazole,
m-bis(4-p-aminophenyl-2-thiazolyl)benzene,
2,2'-bis(m-aminophenyl)-5,5'-dibenzimidazole,
4,4'-diamino-benzanilide,
4,4'-diaminophenylbenzoate,
N,N'-bis(4-aminobenzoyl)-p-phenylenediamine and
3,5-bis(m-aminophenyl)-4-phenyl-1,2,4-triazole.

The preparation of the prepolymer can be effected by heating the reagents, preferably to 50° to 250° C. The reagents can beforehand be intimately mixed. This mixing can, depending on the physical state of the reagents in question, consist of applying the usual techniques for mixing finely divided solids or can consist of dissolving or dispersing one of the reagents in the other maintained in the liquid state. The bis-imide and the diamine can also be heated in a chemically inert solvent such as cresol, dimethylformamide, N-methylpyrrolidone, dimethylacetamide or chlorobenzene.

The prepolymers which are preferably employed are those of melting point from 50° to 130° C. To obtain these, it generally suffices to heat the reagents to 50° to 170° C. for a period which can range approximately from several minutes to several hours, this period being the shorter the higher is the temperature employed. Preferably, the amounts of reagents chosen are such that the ratio $$\frac{\text{No. of mols of N,N'-bis-imide}}{\text{No. of mols of diamine}}$$

is from 1 to 5.

The prepolymers can be used in the solid state or in solution, for example in one of the abovementioned solvents, or in acetone, ethyl acetate, methylene chloride or methanol.

Any epoxy resin can be cured using the process of the invention, for example the glycidyl ethers obtained by reacting polyols such as glycerine, trimethylolpropane, butanediol or pentaerythritol with epichlorohydrin in a known manner. Other suitable epoxy resins are glycidyl ethers of phenols such as 2,2 - bis(4-hydroxyphenyl)propane, bis(hydroxyphenyl)methane, resorcinol, hydroquinone, pyrocatechol, phloroglucinol, 4,4' - dihydroxydiphenyl, and the condensation products of the phenol/aldehyde type. It is also possible to use the reaction products of epichlorhydrin with primary or secondary amines such as bis(4 - methylaminophenyl)methane or bis(4-aminophenyl)sulphone, as well as the aliphatic or alicyclic polyepoxides resulting from the epoxidation of the corresponding unsaturated compounds with per-acids or hydroperoxides.

The new process is especially valuable for curing epoxy resins in which each molecule has at least 2 and preferably more than 3 epoxy groups, preferably essentially aromatic resins such as the glycidyl ethers of poly(hydroxyphenyl)alkanes or of phenol - formaldehyde resins.

The proportion of prepolymer with imide groups can vary within wide limits. It is usually so chosen that the weight of prepolymer is from 20% to 80% of the weight of the mixture of epoxy resin and prepolymer.

The mixtures of epoxy resin and prepolymer can be cured at temperatures of 180° to 280° C., preferably 200° to 250° C.

In one embodiment of the invention, an intimate mixture of the epoxy resin and of the prepolymer is prepared. Depending on the physical characteristics of the ingredients, this process can consist of applying the customary techniques for mixing finely divided solids or of dissolving or suspending one of the constituents of the mixture in the other, maintained in the liquid state, optionally in a solvent such as one of those mentioned above for the utilisation of the prepolymer with imide groups. The mixture of the resin and the prepolymer is then heated to a temperature of the order of 50° to 200° C. until a homogeneous liquid mixture is obtained which can be used as such, for example shaped by simple casting while hot and then subsequently cured under the abovementioned conditions. It is also possible, after cooling and grinding, to use this mixture as a powder which is very suitable for compression moulding processes, optionally in association with a fibrous or pulverulent filler. The mixture can also be used in solution, in a solvent such as one of those which have been mentioned above, to prepare laminated materials the skeleton of which can be based on mineral, vegetable or synthetic fibres.

According to another embodiment of the invention which is principally of advantage where the material is to be shaped by casting, the prepolymer can be prepared in the epoxy resin itself by heating a mixture of the resin with the N,N'-bis-imide of Formula I and the diamine of Formula II. A variant of this embodiment consists of liquefying the mixture of epoxy resin and N,N'-bis-imide by heating and then adding the diamine to this liquid mixture.

The process according to the invention is also useful for glue-bonding and coating various materials such as metals, ceramics or synthetic resins.

The examples which follow illustrate the invention.

EXAMPLE 1

(a) 89.5 g. of N,N'-4,4' - diphenylmethane-bis-maleimide and 19.8 g. of bis(4 - aminophenyl)methane are intimately mixed and the mixture is then kept for 15 minutes in a chamber heated to 150° C. After cooling, the prepolymer is finely ground; it melts at 70° C.

(b) 57.3 g. of an epoxy resin which can be represented by the average formula:

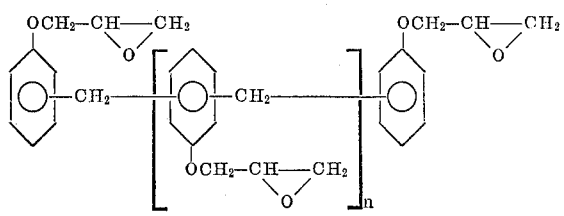

are added to 100 g. of the prepolymer powder thus obtained. [This epoxy resin, which on average contains 0.556 epoxy grouping per 100 g. of product is marketed under the name "Epikote 154"].

The ingredients are intimately mixed and the whole is then kept for 15 minutes in a chamber heated to 160° C. After cooling, the product is ground, and 25 g. of the powder are introduced into a cylindrical mould (diameter: 7.6 cm.). The mould is placed between the platens of a press previously heated to 250° C. and is kept at this temperature for 1 hour under a pressure of 200 bars. After removal from the mould while hot and cooling, the resulting cylindrical object is cut into parallelepiped samples (30 mm. x 10 mm. x 10 mm.) which for a span of 25.4 mm. show a flexural breaking strength at 25° C. of 15.3 kg./mm.$^2$. After a period of severe heat treatment (1300 hours at 250° C.) this strength is still 11.9 kg./mm.$^2$.

EXAMPLE 2

A prepolymer with imide groupings is prepared by heating a mixture of 89.5 g. of N,N' - 4,4' - diphenylmethane bis-maleimide and 24.38 g. of bis(4 - aminophenyl)methane for 30 minutes in a chamber at 150° C. Its melting point is 100° C.

13.9 g. of the epoxy resin described in Example 1 are added to 20 g. of this prepolymer, and the whole is then heated to 160° C. in a heated chamber. After 25 minutes, the residue is cooled and powdered. 20 g. of the powder are moulded under the conditions described in Example 1. The following values are found for the flexural breaking strength of the cured resin at 25° C.

| | Kg./mm.$^2$ |
|---|---|
| Initial | 12.2 |
| After 24 hours at 250° C. | 12.2 |
| After 1300 hours at 250° C. | 10 |

EXAMPLE 3

A prepolymer with imide groupings is prepared by heating a mixture of 44.75 g. of N,N'-4,4'-diphenylmethane-bis-maleimide and 24.7 g. of bis(4-aminophenyl)methane in a chamber at 160° C. for 19 minutes. It melts at 87° C.

68.4 g. of this prepolymer and 72.25 g. of the epoxy resin described in Example 1 are then mixed, initially by mechanical means and then by heating for 20 minutes in a chamber kept at 160° C. A part of the resulting mass is moulded under the conditions described in Example 1 and, after 534 hours at 250° C., the flexural breaking strength at 25° C. is still 10.4 kg./mm.$^2$.

EXAMPLE 4

17.9 g. of the epoxy resin described in Example 1 are added to 8.95 g. of N,N'-4,4'-diphenylmethane-bis-maleimide, and the vessel containing the mixture is then heated in a fluid at 150° C., until a homogeneous liquid is obtained.

1.98 g. of bis(4-aminophenyl)methane are then added without cooling, and, after homogenisation, the liquid mass is cast in a parallelepiped mould (125 mm. x 7.5 mm. x 6 mm.) the internal walls of which have a polytetrafluoroethylene lining, and which has beforehand been heated to 200° C. The whole is left at this temperature for 2 hours and is then removed from the mould while hot. The moulded article is subjected to a supplementary heat treatment for 67 hours at 250° C. It then has a flexural breaking strength at 25° C. of 15.7 kg./mm$^2$. After 570 hours at 250° C., this strength is still 12.6 kg./mm$^2$.

EXAMPLE 5

A prepolymer with imide groupings is prepared in the manner described in Example 1, but using 33 g. of bis(4-aminophenyl)methane. It melts at 100° C. This prepolymer is ground. 16.6 g. of the epoxy resin described in Example 1 are added to 20 g. of the powder obtained, and the vessel containing the mixture is heated in a fluid at 150° C. until a homogeneous liquid is obtained. The liquid mixture is cast into the parallelepiped mould used in Example 4 previously heated to 200° C. The whole is then kept at 200° C. for 1 hour 15 minutes, and the article is removed from the mould while hot. The moulded article has a flexural breaking strength at 25° C. of 11.8 kg./mm$^2$. After being kept in a chamber at 250° C. for 314 hours, this strength is 13 kg./mm$^2$.

EXAMPLE 6

30 g. of N,N'-4,4'-diphenylether-bis-maleimide are added to 15 g. of the epoxy resin commercially available under the name "Epon 1031" previously heated to 160° C. The mixture is maintained for 4 minutes at this temperature and then 6.6 g. of bis(4-aminophenyl)methane are added. The mixture is kept for a further 3 minutes in an enclosure heated to 160° C. After cooling, the residue obtained is ground up and 17 g. of the powder obtained are introduced into a cylindrical mould (diameter 7.6 cm.). The mould is placed between the plates of a press previously heated to 230° C. and this temperature is maintained for 1 hour with a pressure of 250 bars. The object obtained is removed hot from the mould, and, after cooling, it is subjected to a supplementary thermal treatment at 250° C. for 63 hours. It then has a flexural breaking strength at 25° C. of 9.1 kg./mm$^2$. After a further 496 hours at 250° C., this strength is still 9.9 kg./mm$^2$.

The epoxy resin used in this example can be represented by the following average formula:

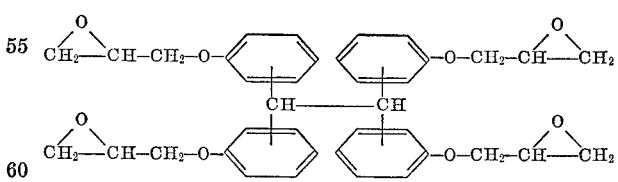

It contains on average 0.459 epoxy groups for each 100 g.

EXAMPLE 7

The operation is carried out as described in Example 6 starting from 15 g. of N,N'-meta-phenylene-bis-maleimide, 15 g. of the same epoxy resins, and 4.48 g. of bis(4-aminophenyl)ether. 21 g. of the powder obtained are moulded under the conditions described in Example 6 but for a period of 45 minutes only. After the supplementary thermal treatment, the object obtained has a flexural breaking strength at 25° C. of 7.1 kg./mm$^2$. After a further 496 hours at 250° C. this strength is still 8.7 kg./mm$^2$.

EXAMPLE 8

30 g. of N,N'-4,4'-diphenylmethane-bis-maleimide is added to 19.31 g. of the epoxy resin commercially available under the name "Epikote 173" previously heated to 150° C. 6.6 g. of bis(4-aminophenyl)methane are then added without cooling, and the mixture is kept at 150° C. for 20 minutes. The resulting product is then poured into the parallelepiped mould described in Example 4 previously heated to 200° C. It is kept in the mould for 16 hours at this temperature and then removed while hot. The moulded object is subjected to a supplementary thermal treatment for 48 hours at 250° C. It then has a flexural breaking strength of 12.7 kg./mm². After a further 285 hours at 250° C., this strength is still 13 kg./mm².

EXAMPLE 9

The operation is effected as described in Example 8 starting from 30 g. of the same bis-imide, 16.93 g. of the epoxy resin commercially available under the name "Epikote 171," and 6.6 g. of the same diamine. The mixture is kept in the liquid state for 3 minutes. Moulding is then effected at 200° C. for 1 hour 50 minutes. After the supplementary thermal treatment, the moulded object has a flexural breaking strength at 25° C. of 12.8 kg./mm². After a further 285 hours at 250° C., this strength is still 1.6 kg./mm².

We claim:

1. Process for producing a cured epoxy resin containing an average of more than one epoxy group per molecule which comprises heating consisting essentially of an epoxy resin with a prepolymer having a melting point below 200° C. obtained by heating an N,N'-bis-imide of the formula:

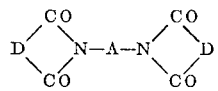

in which D represents a divalent organic radical containing a carbon-carbon double bond and A is a divalent organic radical containing at least two carbon atoms, with a diamine of the formula:

$$H_2N-B-NH_2$$

in which B represents a divalent organic radical of not more than 30 carbon atoms, the ratio

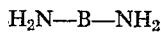

being at least equal to 1, the weight of said polymer being from 20% to 80% of the combined weight of the epoxy resin and prepolymer.

2. Process according to claim 1 in which the prepolymer is produced by heating the bis-imide with the diamine in the presence of the epoxy resin.

3. Process according to claim 1 in which the curing is effected by heating at 180° to 280° C.

4. Process according to claim 1 in which the prepolymer is derived from N,N'-4,4'-diphenylmethane-bis-maleimide and bis(4-aminophenyl)methane in a ratio $$\frac{\text{No. of mols of N,N'-bis-imide}}{\text{No. of mols of diamine}}$$

from 1 to 5.

5. Process according to claim 1 in which the prepolymer is derived from N,N'-4,4'-diphenylether-bis-maleimide, N,N'-meta-phenylene-bis-maleimide, or N,N'-4,4'-diphenylmethane-bis-maleimide, and bis(4-aminophenyl)methane or bis(4-aminophenyl)ether, in a ratio $$\frac{\text{No. of mols of N,N'-bis-imide}}{\text{No. of mols of diamine}}$$

from 1 to 5.

6. A curable composition consisting essentially of an epoxy resin containing an average of more than one epoxy group per molecule and a prepolymer having a melting point below 200° C. obtained by heating an N,N'-bis-imide of the formula:

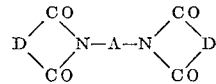

in which D represents a divalent organic radical containing a carbon-carbon double bond and A is a divalent organic radical containing at least two carbon atoms, with a diamine of the formula:

$$H_2N-B-NH_2$$

in which B represents a divalent organic radical of not more than 30 carbon atoms, the ratio

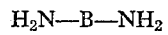

being at least equal to 1, the weight of said polymer being from 20% to 80% of the combined weight of the epoxy resin and prepolymer.

7. A composition according to claim 6 in which the prepolymer is derived from N,N'-4,4'-diphenylether-bis-maleimide, N,N'-meta-phenylene-bis-maleimide, or N,N'-4,4'-diphenylmethane-bis-maleimide, and bis(4-aminophenyl)methane or bis(4-aminophenyl)ether, in a ratio $$\frac{\text{No. of mols of N,N'-bis-imide}}{\text{No. of mols of diamine}}$$

from 1 to 5.

8. A composition consisting essentially of an epoxy resin containing an average of more than one epoxy group per molecule, an N,N'-bis-imide of the formula:

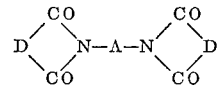

in which D represents a divalent organic radical containing a carbon-carbon double bond and A is a divalent organic radical containing at least two carbon atoms, and a diamine of the formula:

$$H_2N-B-NH_2$$

in which B represents a divalent organic radical of not more than 30 carbon atoms, the ratio

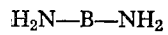

being at least equal to 1, the combined weight of said bis-imide and said diamine being from 20% to 80% of the combined weight of the epoxy resin, bis-imide and diamine.

9. A composition according to claim 8 in which the bis-imide is N,N'-4,4'-diphenylether-bis-maleimide, N,N'-meta-phenylene-bis-maleimide, or N,N'-4,4' - diphenyl methane-bis-maleimide and the diamine is bis(4-aminophenyl)methane or bis(4-aminophenyl)ether in a molar ratio of 1:1 to 5:1.

References Cited
FOREIGN PATENTS
1,190,718  5/1970  Great Britain.
1,555,564  1/1969  France.

PAUL LIEBERMAN, Primary Examiner

U.S. Cl. X.R.

260—2 EpCN, 47 EpCN, 78 UA, 78 SC